United States Patent
Xu et al.

(10) Patent No.: US 11,025,904 B2
(45) Date of Patent: Jun. 1, 2021

(54) METHOD AND APPARATUS FOR TEMPORAL MOTION VECTOR PREDICTION

(71) Applicant: Tencent America LLC, Palo Alto, CA (US)

(72) Inventors: Xiaozhong Xu, State College, PA (US); Xiang Li, San Diego, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/203,495

(22) Filed: Nov. 28, 2018

(65) Prior Publication Data

US 2019/0379888 A1    Dec. 12, 2019

Related U.S. Application Data

(60) Provisional application No. 62/682,588, filed on Jun. 8, 2018.

(51) Int. Cl.
| | |
|---|---|
| *H04N 19/105* | (2014.01) |
| *H04N 19/139* | (2014.01) |
| *H04N 19/176* | (2014.01) |
| *H04N 19/44* | (2014.01) |
| *H04N 19/503* | (2014.01) |

(52) U.S. Cl.
CPC ......... *H04N 19/105* (2014.11); *H04N 19/139* (2014.11); *H04N 19/176* (2014.11); *H04N 19/44* (2014.11); *H04N 19/503* (2014.11)

(58) Field of Classification Search
CPC .. H04N 19/105; H04N 19/139; H04N 19/176; H04N 19/44; H04N 19/503
See application file for complete search history.

(56) References Cited

U.S. PATENT DOCUMENTS

| | | |
|---|---|---|
| 8,526,495 B2 | 9/2013 | Liu et al. |
| 9,049,452 B2 | 6/2015 | Liu et al. |
| 9,510,012 B2 | 11/2016 | Liu et al. |
| 9,813,726 B2 | 11/2017 | Liu et al. |
| 9,961,358 B2 | 5/2018 | Liu et al. |

(Continued)

OTHER PUBLICATIONS

High Efficiency Video Coding (HEVC), Rec. ITU-T H.265 and ISO/IEC 23008-2, Dec. 2016.

(Continued)

*Primary Examiner* — Joseph W Becker
(74) *Attorney, Agent, or Firm* — Oblon, McClelland, Maier & Neustadt, L.L.P.

(57) ABSTRACT

A method of video decoding for a decoder includes acquiring a current picture from a coded video bitstream. The method further includes selecting a first neighboring block from a plurality of neighboring blocks of a current block in the current picture. The method further includes determining, based on a motion vector predictor of the selected first neighboring block, a candidate block that is included in a previously decoded picture and that is one of (i) neighboring to a collocated block of the current block and (ii) within the collocated block. The method further includes performing temporal motion vector prediction for the current block based on a motion vector predictor of the candidate block.

20 Claims, 18 Drawing Sheets

(56) References Cited

U.S. PATENT DOCUMENTS

| | | | | |
|---|---|---|---|---|
| 2013/0136184 A1* | 5/2013 | Suzuki | ............... | H04N 19/52 |
| | | | | 375/240.16 |
| 2013/0142254 A1* | 6/2013 | Sugio | ............... | H04N 19/52 |
| | | | | 375/240.03 |
| 2018/0255316 A1* | 9/2018 | Zhang | ............... | H04N 19/503 |
| 2019/0268617 A1* | 8/2019 | Xu | ............... | H04N 19/139 |
| 2019/0356922 A1* | 11/2019 | Park | ............... | H04N 19/573 |
| 2020/0059642 A1* | 2/2020 | Kang | ............... | H04N 19/105 |

OTHER PUBLICATIONS

Xu et al., "Non-CE2: Intra BC merge mode with default candidates", ISO/IEC JTC1/SC29/WG11 JCTVC-S0123, Oct. 2014.

Xu et al., "CE2: Test 3.2—Intra BC merge mode with default candidates", ISO/IEC JTC1/SC29/WG11 JCTVC-T0073, Feb. 2015.

Yang et al., "Description of Core Experiment 4 (CE4): Inter prediction and motion vector coding", ISO/IEC JTC1/SC29/WG11 JVET-J1024, Apr. 2018.

Liu et al., "Nonlinear motion-compensated interpolation for low-bit-rate video" in Applications of Digital Image Processing XXIII, vol. 4115, p. 203-214, 2000.

Liu et al., "MCI-embedded motion-compensated prediction for quality enhancement of frame interpolation" in Multimedia Systems and Applications III, vol. 4209, p. 251-262, Mar. 2001.

Liu et al., "Video Coding via Adaptive Selection of Generalized Motion Prediction Modes" in the Picture Coding Symposium 2001, Seoul, Korea, Apr. 25-27, 2001.

\* cited by examiner

METHOD AND APPARATUS FOR TEMPORAL MOTION VECTOR PREDICTION

INCORPORATION BY REFERENCE

This present disclosure claims the benefit of priority to U.S. Provisional Application No. 62/682,588, "METHODS FOR TEMPORAL MOTION VECTOR PREDICTION" filed on Jun. 8, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Temporal motion vector prediction (TMVP) for a current block may be derived from a collocated block. When motion occurs from one picture to another, the collocated blocks in two pictures (e.g., the current picture and the collocated picture) may not contain the same moving object. Accordingly, the existing derivation of temporal motion vectors may not result in the most accurate TMVP.

SUMMARY

An exemplary embodiment of the present disclosure includes a method of video decoding for a decoder. The method includes acquiring a current picture from a coded video bitstream. The method further includes selecting a first neighboring block from a plurality of neighboring blocks of a current block in the current picture. The method further includes determining, based on a motion vector predictor of the selected first neighboring block, a candidate block that is included in a previously decoded picture and that is one of (i) neighboring to a collocated block of the current block and (ii) within the collocated block. The method further includes performing temporal motion vector prediction for the current block based on a motion vector predictor of the candidate block.

An exemplary embodiment of the present disclosure includes a video decoder. The video decoder includes processing circuitry configured to acquire a current picture from a coded video bitstream. The processing circuitry is further configured to select a first neighboring block from a plurality of neighboring blocks of a current block in the current picture. The processing circuitry is further configured to determine, based on a motion vector predictor of the selected first neighboring block, a candidate block that is included in a previously decoded picture and that is one of (i) neighboring to a collocated block of the current block and (ii) within the collocated block. The processing circuitry is further configured to perform temporal motion vector prediction for the current block based on a motion vector predictor of the candidate block.

A non-transitory computer readable medium having instructions stored therein, which when executed by a processor in a video decoder causes the processor to execute a method. The method includes acquiring a current picture from a coded video bitstream. The method further includes selecting a first neighboring block from a plurality of neighboring blocks of a current block in the current picture. The method further includes determining, based on a motion vector predictor of the selected first neighboring block, a candidate block that is included in a previously decoded picture and that is one of (i) neighboring to a collocated block of the current block and (ii) within the collocated block. The method further includes performing temporal motion vector prediction for the current block based on a motion vector predictor of the candidate block.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
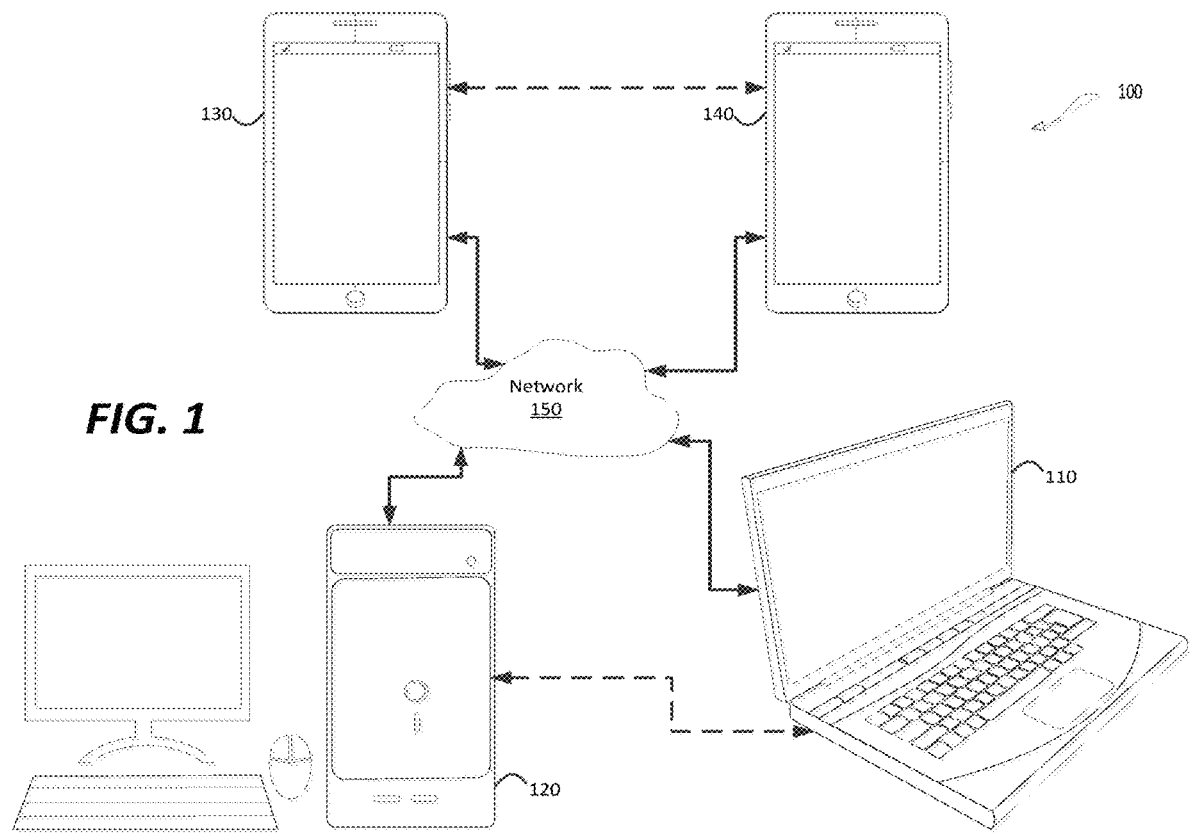
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
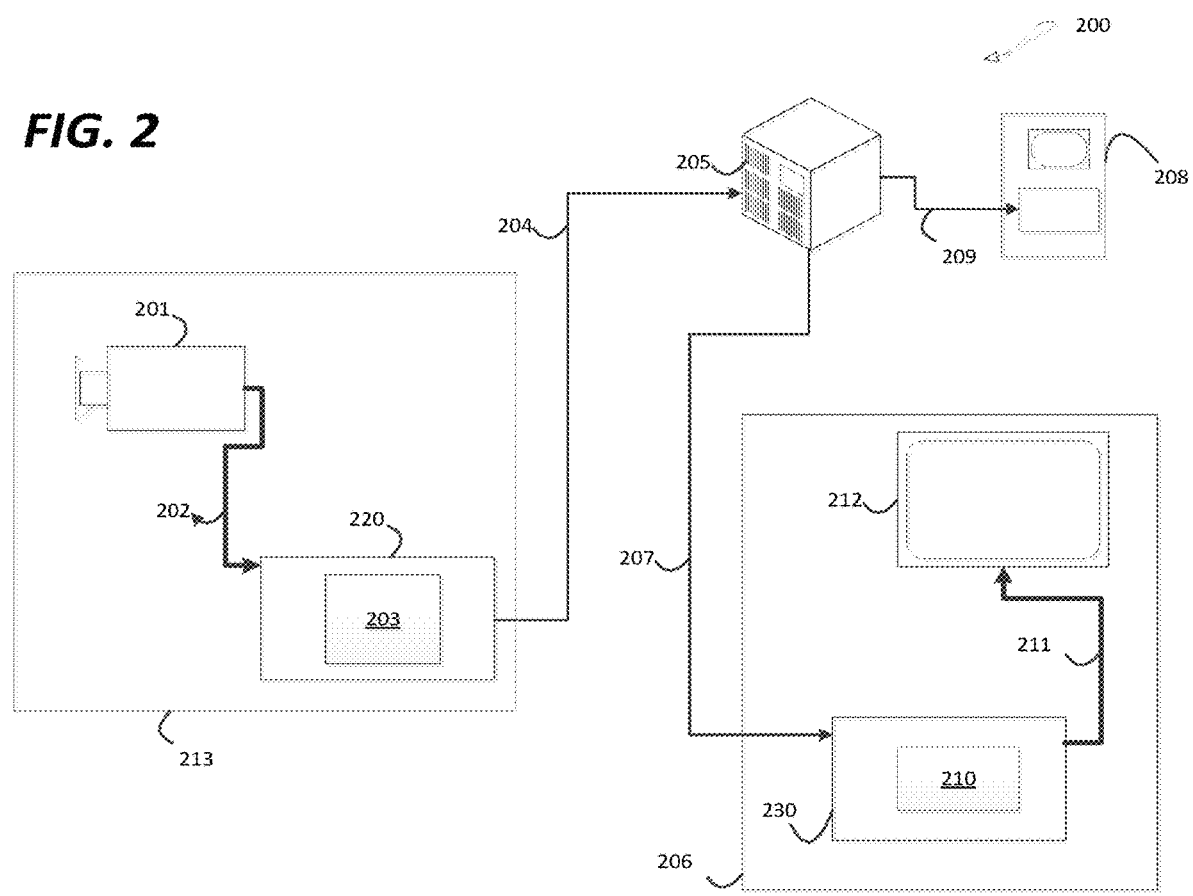
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
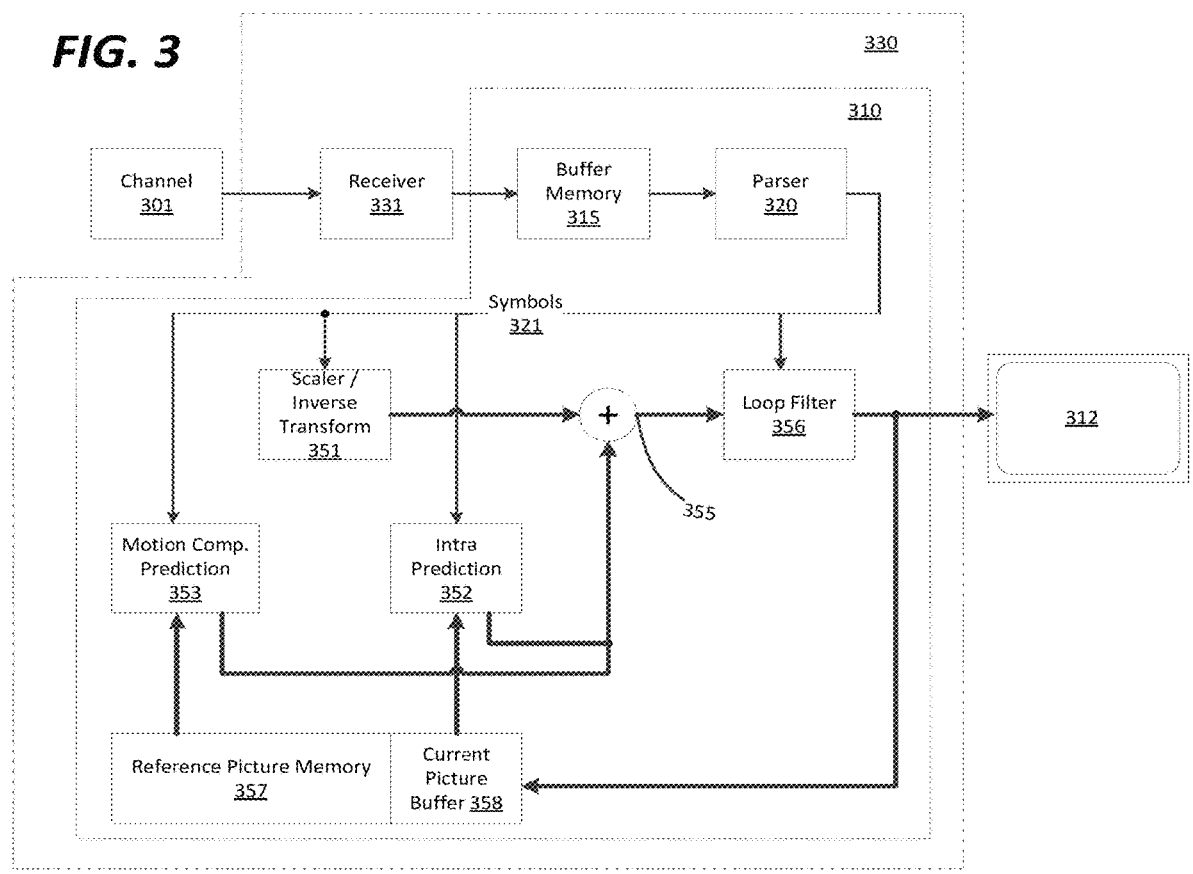
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
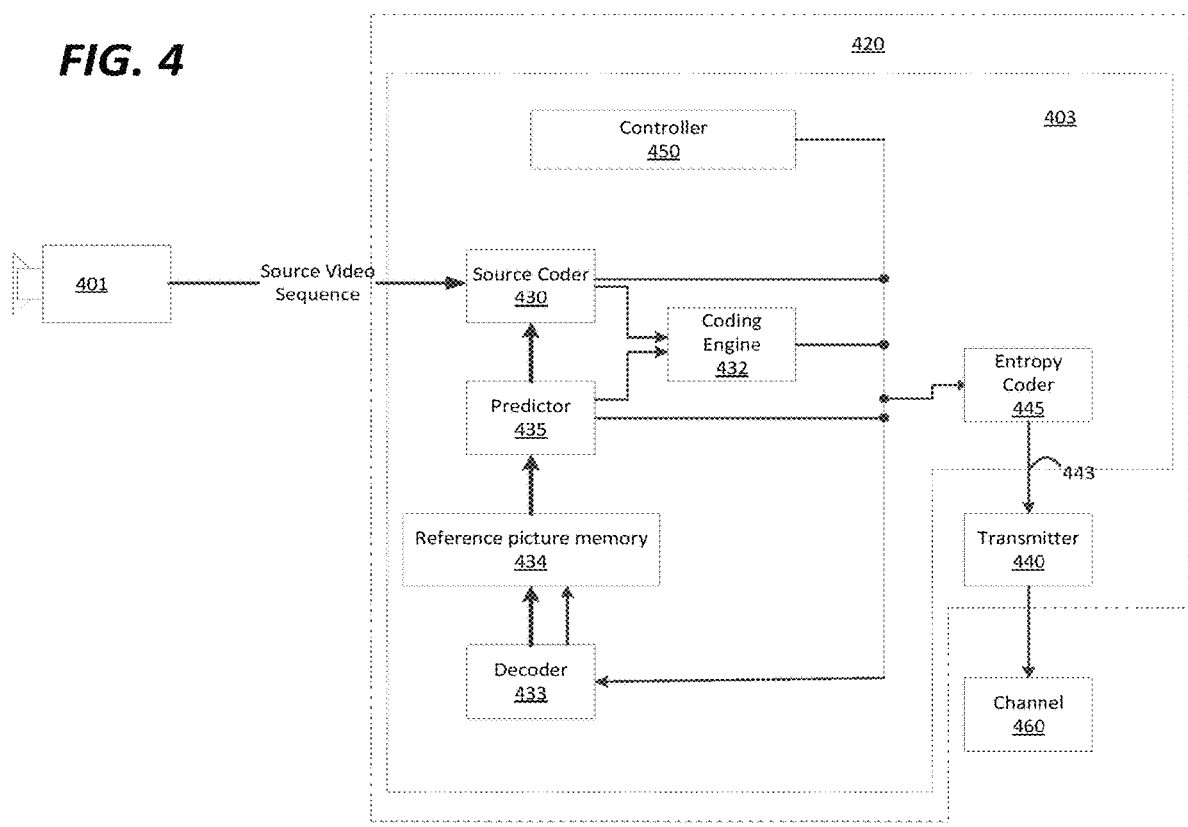
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401)(that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SET) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 5:
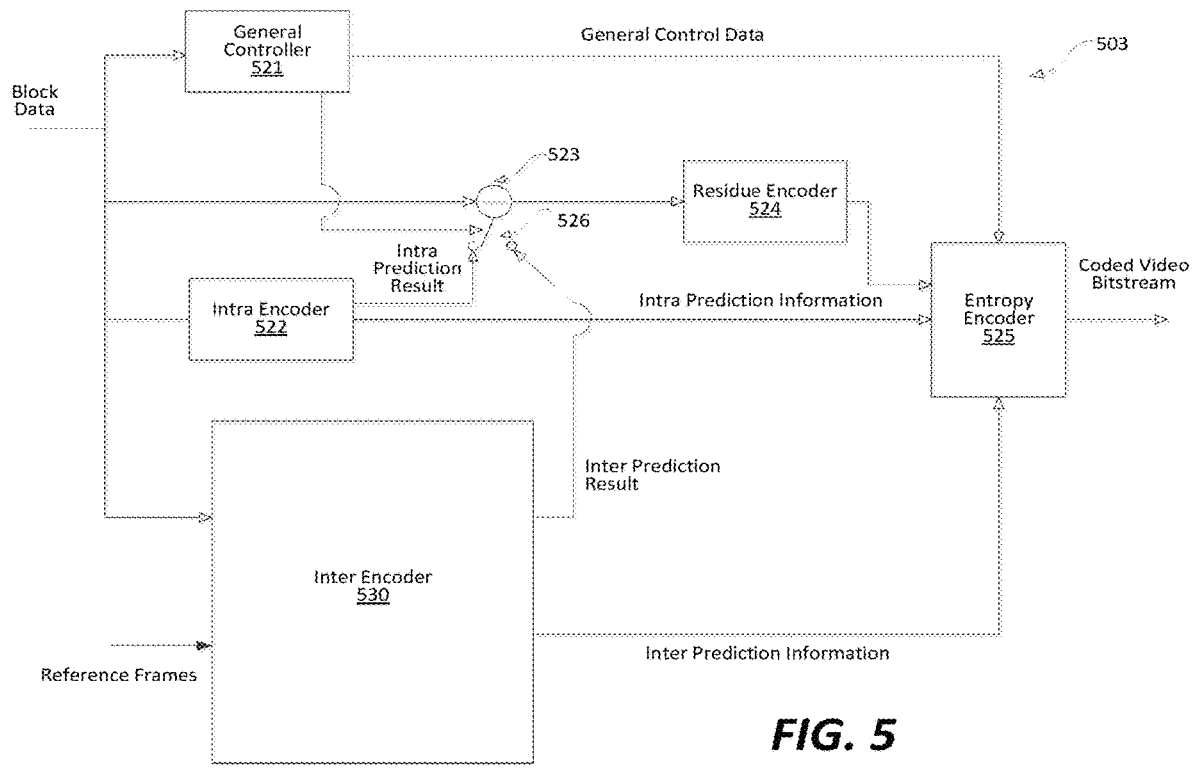
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521) and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (521) is configured to determine general control data and control other components of the video encoder (503) based on the general control data. In an example, the general controller (521) determines the mode of the block, and provides a control signal to the switch (526) based on the mode. For example, when the mode is the intra, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data in the frequency domain, and generate the transform coefficients. The transform coefficients are then subject to quantization processing to obtain quantized transform coefficients.

The entropy encoder (525) is configured to format the bitstream to include the encoded block. The entropy encoder (525) is configured to include various information according to a suitable standard, such as HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
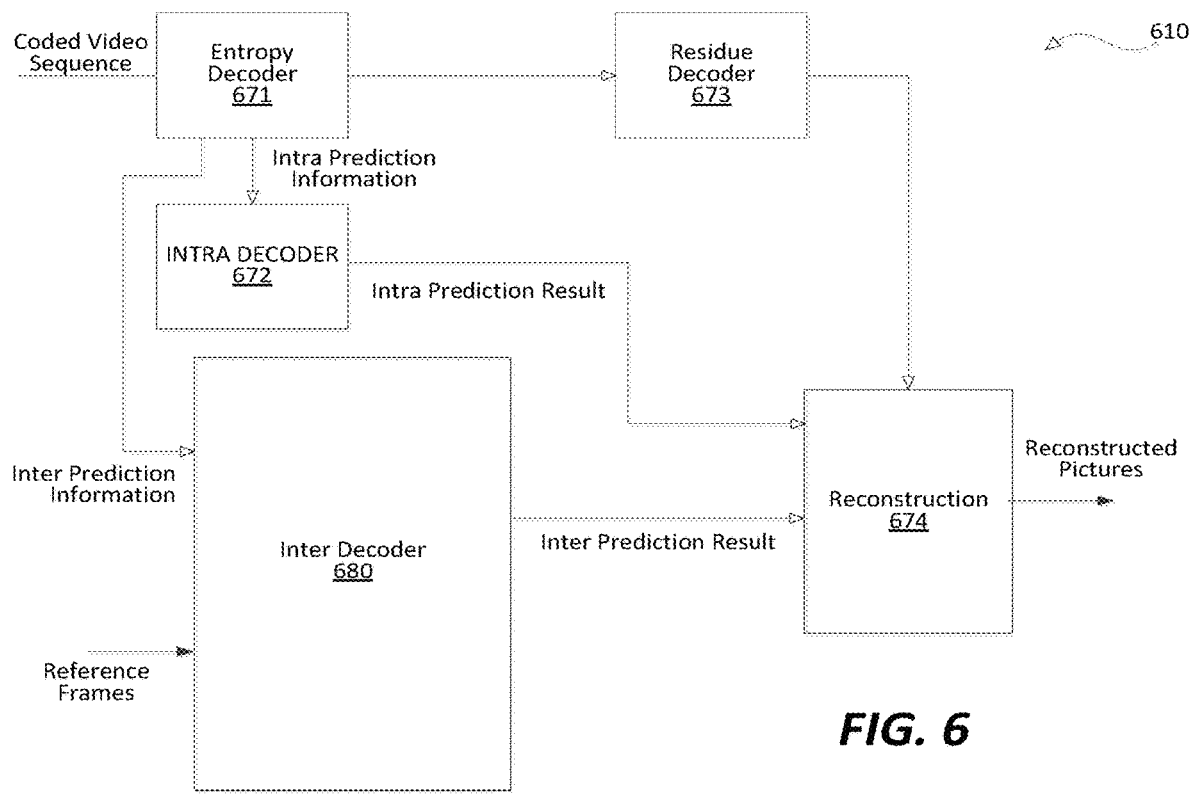
FIG. 6 shows a block diagram of a decoder in accordance with another embodiment.

FIG. 6 shows a diagram of a video decoder (610) according to another embodiment of the disclosure. The video decoder (610) is configured to receive a coded pictures that are part of a coded video sequence, and decode the coded picture to generate a reconstructed picture. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (672) or the inter decoder (680) respectively residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter QP), and that information may be provided by the entropy decoder (671) (datapath not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403) and (503), and the video decoders (210), (310) and (610) can be implemented using any suitable technique. In an embodiment, the video encoders (203), (403) and (503), and the video decoders (210), (310) and (610) can be implemented using one or more integrated circuits. In another embodiment, the video encoders (203), (403) and (403), and the video decoders (210), (310) and (610) can be implemented using one or more processors that execute software instructions.

According to some embodiments, a motion vector (MV) for a block can be coded either in an explicit way, to signal the difference between a motion vector predictor, or in an implicit way, to be indicated as derived from one previously coded or generated motion vector, or motion vector pair if coded using bi-directional prediction. The implicit coding of a motion vector may be referred to as merge mode, where a current block is merged into a previously coded block by sharing the motion information of the previously coded block.

Figure 7:
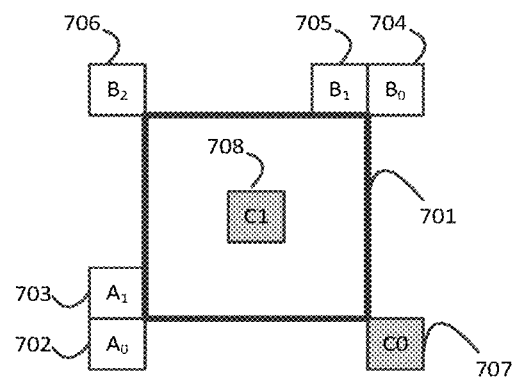
FIG. 7 is a schematic illustration of a current block and surrounding spatial merge candidates and temporal candidates of the current block.

Merge candidates may be formed by checking motion information from either spatial or temporal neighbouring blocks of the current block. Referring to FIG. 7, a current block (701) comprises samples that have been found by the encoder/decoder during the motion search process to be predictable from a previous block of the same size that has been spatially shifted. In some embodiments, instead of coding that motion vector directly, the motion vector can be derived from metadata associated with one or more reference pictures, for example, from a most recent (in decoding order) reference picture, using the motion vector associated with either one of five surrounding samples, denoted A0, A1, B0, B1, and B2 (702 through 706, respectively). The blocks A0, A1, B0, B1, and B2 may be referred to as spatial merge candidates. These candidates may be sequentially checked into a merge candidate list. A pruning operation may be performed to make sure duplicated candidates are removed from the list.

In some embodiments, after putting spatial candidates into the merge list, temporal candidates are also checked into the list. For example, a current block's collocated block in a specified reference picture is found. The motion information at the C0 position (707) in the reference picture is used as a temporal merge candidate. The C0 position may be a block in the reference picture in which the top left corner of this block is at a bottom right corner of a collocated block in the reference picture of the current block 701. The collocated block in the reference picture may include the same position coordinates (e.g., x and y coordinates) as the current block 701. If the block at the C0 position (707) is not coded in an inter mode or is not available, the block at the C1 position may be used. The block at the C1 position may have a top left corner at a center location (e.g., w/2, h/2) of a block within the collocated block in the reference picture. Particularly, the block at position C1 may be a sub-block of the collocated block in the reference picture. In the above example, w and h are the width and height of the block, respectively.

According to some embodiments, Advanced Motion Vector Prediction (AMVP) uses spatial and temporal neighboring blocks' motion information to predict the motion information of a current block, while the prediction residue is further coded. The AMVP mode may also be referred to as the residue mode. FIG. 7 illustrates examples of spatial and temporal neighboring candidates. In an example of the AMVP mode, a two-candidate motion vector predictor list is formed. The first candidate predictor is from a first available motion vector from the left edge in the order of the spatial A0 and A1 positions. The second candidate predictor is from a first available motion vector from the top edge, in the order of spatial B0, B1, and B2 positions. If no valid motion vector is found from the checked locations for either the left edge or the top edge, no candidate will be filled in the motion vector predictor list. If the two candidates are available and are the same, one candidate is kept in the motion vector predictor list. If the motion vector predictor list is not full with two different candidates, the temporal collocated block's motion vector in the reference picture, after scaling, at the C0 location is used as another candidate. If motion information at the collocated block of the C0 location in the reference picture is not available, the collocated block of location C1 in the reference picture is used instead. If, after checking the spatial and temporal candidates, there are still not enough motion vector predictor candidates, the zero motion vector is used to fill up the motion vector predictor list.

Embodiments of the present disclosure use previously coded motion vectors, which are from a reference picture different from the current picture, as predictors for motion vector prediction of the current block. Different from conventional TMVP derivation, in some embodiments, a reliable collocated block's position in a collocated reference picture is used for TMVP derivation. In some embodiments, a current block's spatial neighboring motion information is used to determine, for performing TMVP derivation, a candidate location with respect to a collocated block of a current block in the collocated picture. The disclosed embodiments can be applied to either merge mode or residue mode.

Figure 8:
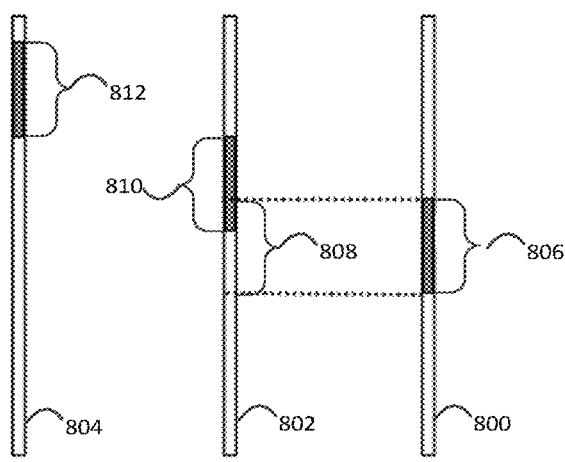
FIG. 8 illustrates different pictures for a moving object.

When a current block contains a moving object, the current block's collocated block (i.e., block having same coordinates as the current block) in a previously coded reference picture may not contain the same object. FIG. 8 illustrates an example of this concept. FIG. 8 illustrates a current picture 800, a collocated picture 802, and a reference picture 804. The current picture includes a current block 806. The collocated picture 802 includes a collocated block designated by 808. The collocated block 808 includes the same coordinates as the current block 806. Furthermore, the collocated picture 802 and reference picture 804 include the same moving object, designated by 810 and 812, respectively. In this example this moving object also coincides with the current block 806. As illustrated in FIG. 8, the collocated block 808 of the current block 806 contains a fraction of the same moving object. The collocated picture may be the picture from which the TMVP is derived. The collocated picture may be any reference picture for the current picture, and may be chosen by a slice level syntax, which is an index telling which of the reference pictures in the list is chosen.

Figure 9:
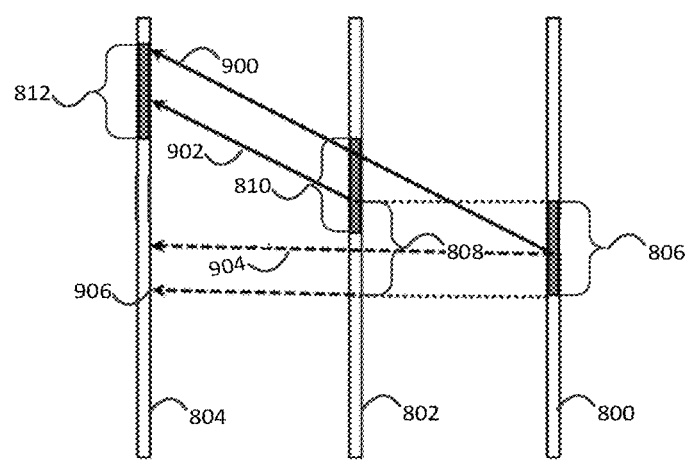
FIG. 9 illustrates an example TMVP derivation.

FIG. 9 illustrates an example of performing TMVP derivation on the collocated block 808 of the current block 806 using the blocks at the C0 and C1 positions (FIG. 7). As illustrated in FIG. 9, the motion vectors corresponding to the C0 position 906 (bottom right corner) and the C1 position 904 (center point) of the collocated block 808 are used to derive the TMVP for the current block 806. However, as illustrated in FIG. 9, neither the C0 position (906) nor the C1 position (904) of the collocated block 808 contains contents that are related to the moving object 810. Instead, if the motion vector 902 of a top corner of the collocated block 808 is used for TMVP derivation, the derived TMVP after scaling (900) is more accurate as compared to the ones derived from the C0 (906) and C1 (904) positions of the collocated block 808. Accordingly, embodiments of the present disclosure enable the selection of candidate blocks from candidate locations with respect to a collocated block in addition to the C0 and C1 positions to provide a more accurate TMVP derivation.

The scaling performed for the example in FIG. 9 is to adjust a motion vector predictor's magnitude and/or sign so that when using the predictor for the current block 806 and current reference picture 804, the scaled motion vector predictor will point to the same object from the current block 806 to the current reference picture 804. In this regard, the larger the distance between a current picture to a reference picture, the larger the corresponding motion vector becomes. Using FIG. 9 as an example, motion vector 902 is a motion vector from moving object 810 to 812. When coding the current block 806, the motion vector 902 is used for TMVP derivation. If motion vector 902 is directly used as is (i.e., no scaling), when 804 is the reference picture, then the reference block indicated by 902 will not be 812, but somewhere below it. Accordingly, by performing scaling, the motion vector 902 is increased in magnitude to motion vector 900, which points to 812 between current block 806 and the corresponding reference picture 804.

In the example illustrated in FIGS. 8 and 9, the reference picture for the current picture 804 and the reference picture for the collocated picture 802 are the same (e.g., reference picture 804). However, in other examples, the reference picture for the current picture 804 and the reference picture for the collocated picture 802 may be different from each other.

Figure 10:
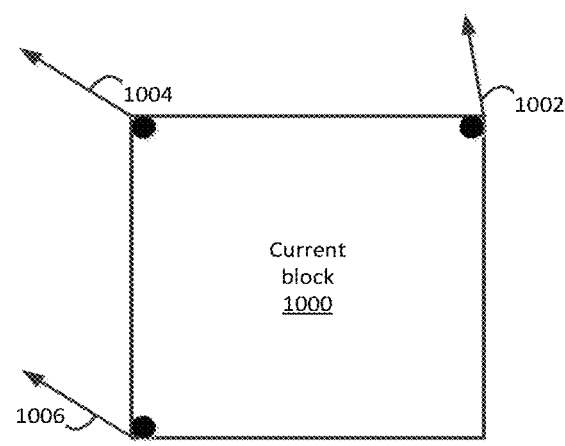
FIG. 10 illustrates example motion vectors for a current block.
Figure 11:
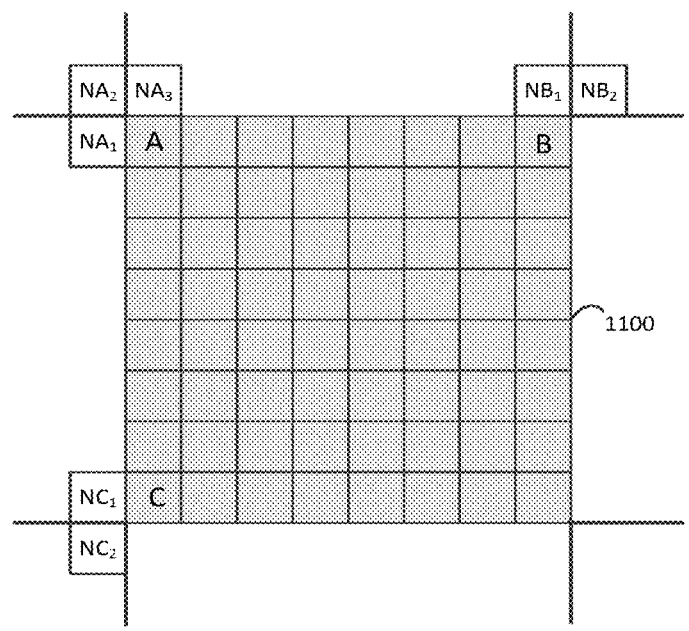
FIG. 11 illustrates spatial neighboring blocks for a current block.

If a current block contains a moving object, the current block's spatial neighbors tend to have similar motions or motion directions as the current block. Accordingly, in some embodiments, motion information of the current block's spatial neighboring blocks (e.g., blocks A0, A1, B0, B1, and B2 in FIG. 7) is used to indicate one or more preferred candidate locations with respect to a collocated block of the current block for the TMVP derivation. FIG. 10 illustrates a current block 1000 and example motion information (e.g., motion vector predictors 1002, 1004, and 1006) obtained from neighboring blocks at corners of the current block 1000. FIG. 11 illustrates another example of current block 1100 that is divided into a plurality of sub-blocks with corners A, B, and C. The block corresponding to corner A is adjacent to neighboring blocks $NA_1$-$NA_3$, the block corresponding to corner B is adjacent to neighboring blocks $NB_1$—$NB_2$, and the block corresponding to corner C is adjacent to neighboring blocks $NC_1$—$NC_2$. Each of the neighboring blocks $NA_1$-$NA_3$, $NB_1$—$NB_2$, and $NC_1$—$NC_2$ may be previously coded/decoded blocks having motion information (e.g., motion vector predictors) used to select a candidate location.

In one embodiment, one or more of the top-left (A), top-right (B) and bottom-left (C) corner positions of the current block 1100 is used to evaluate a candidate block from a candidate location with respect to a collocated block of the current block 1100 for TMVP derivation. In one example, the motion vector combinations of $NA_2$, $NB_2$, and $NC_2$ are used to determine a candidate location. As an example, the first available candidate from neighboring blocks $NA_x$, the first available candidate from neighboring blocks $NB_x$, and the first available candidate from neighboring blocks NCx may be used. In other embodiments, other neighboring blocks such as blocks at the middle of the left side of current block 1100, or blocks at the middle of the top side of the current block are considered. In some embodiments, a combination of motion vector predictors for the corners of block 1100 is used. For example, motion vector predictors for corners (i) A and B, (ii) B and C, or (iii) A and C are used.

According to some embodiments, if one of the spatial neighboring locations is not available, a replacement location is considered. In one example, a first available left neighbor, in order of $NC_2$, $NC_1$ is checked. If these neighboring blocks are unavailable, then a first available top neighbor in order of $NB_2$, $NB_1$, and $NA_2$ is checked as the replacement location. In another example, a first available left neighbor, in order of $NC_2$, $NC_1$, $NA_1$, and $NA_2$ is checked. If these neighboring blocks are unavailable, then a first available top neighbor in order of $NB_2$, $NB_1$, $NA_3$, and $NA_2$ is checked as the replacement location. In another example, when one location is not available, a zero motion vector is used for that location.

Figure 12:
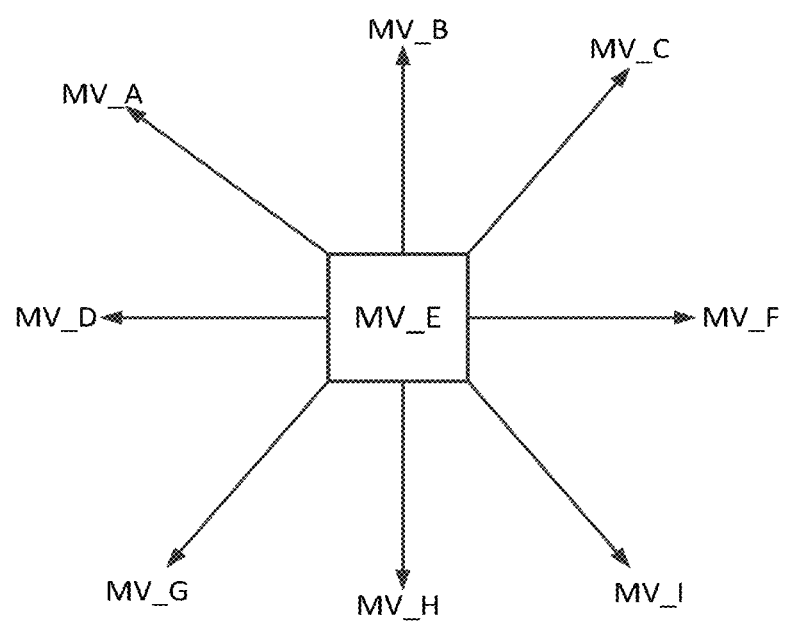
FIG. 12 illustrates example categories of motion vector directions.

According to some embodiments, a motion vector predictor that is a non-zero motion vector is placed in one of eight directional categories, as illustrated in FIG. 12. For example, when a non-zero motion vector is obtained from one of the neighboring blocks illustrated in FIG. 11, the non-zero motion vector will be categorized as one of MV_A, MV_B, MV_C, MV_D, MV_F, MV_G, MV_H, and MV_I. Although eight directional categories are illustrated in FIG. 12, the present disclosure is not limited to these directional categories, and other embodiments may include more or less directional categories.

In some embodiments, if the obtained non-zero motion vector does not match one of these directional categories, the obtained non-zero motion vector will be placed in the nearest directional category. In some embodiments, a motion vector predictor that is a zero motion vector is placed in the MV_E category, as illustrated in FIG. 12. In some embodiments, for each category, a corresponding candidate location with respect to a collocated block is selected for TMVP derivation.

Figure 14:
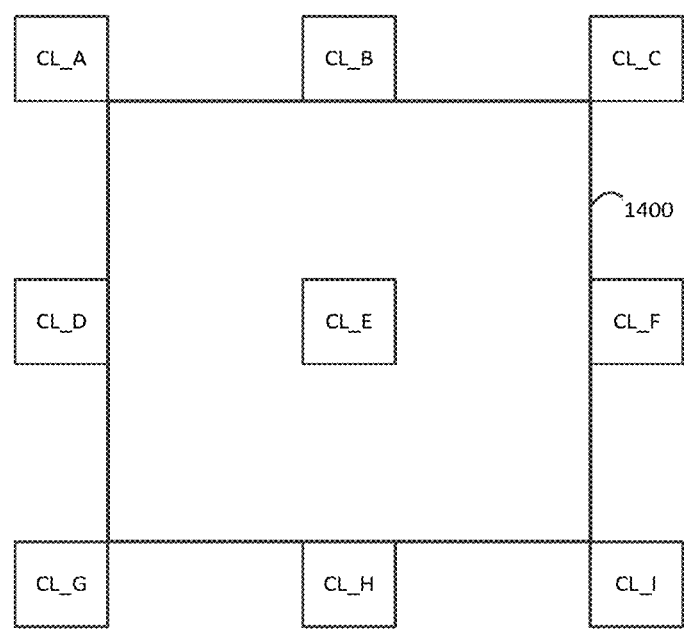
FIG. 14 illustrates example candidate locations with respect to a collocated block.

According to some embodiments, if a single motion vector predictor of a spatial neighbor is used in consideration of a TMVP location, according to the category of this motion vector predictor in FIG. 12, a candidate block from a corresponding candidate location with respect to a collocated block is selected, as illustrated in FIG. 14. For example, if a motion vector predictor is placed in the category MV_A (FIG. 12), a candidate block at candidate location CL_A is selected. In this regard, CL_A is a candidate location with respect to collocated block 1400. Accordingly, categories MV_A, MV_B, MV_C, MV_D, MV_F, MV_G, MV_H, and MV_I correspond to candidate locations CL_A, CL_B, CL_C, CL_D, CL_F, CL_G, CL_H, and CL_I, respectively, in FIG. 14. Each candidate location may correspond to one more candidate blocks, where a candidate block from the candidate location is selected for TMVP derivation.

In one embodiment, the first available motion vector predictor, in the order of $NA_2$, $NA_1$, $NA_3$, $NB_2$, $NB_1$, $NC_2$, and $NC_1$ in FIG. 11 is used. In another embodiment, when only one motion vector predictor from the spatial neighbors is available, or two motion vector predictors from the spatial neighbors are the same, that motion vector predictor is used to determine a candidate location with respect to a collocated block for TMVP derivation. In another embodiment, the first available motion vector predictor is used to indicate a candidate location with respect to a collocated block. The first available motion vector predictor may be the first candidate in the merge list before TMVP, or the first derived candidate in the motion vector predictor candidate list before TMVP in residue mode.

According to some embodiments, the motion vector predictors from two spatial neighbors are considered. In one example, the two spatial neighbors are selected from two of the three corners in FIG. 11 such as $NB_2$ and $NA_2$. If the motion vector predictors from these two spatial neighbors are in the same category (FIG. 12), then the corresponding candidate location of that category is selected. If both of the motion vector predictors are zero motion vectors, then these motion vector predictors are placed in category MV_E, and a candidate block at candidate location CL_E is selected for TMVP derivation. In another example, if one of the motion vector predictors is a zero motion vector, and the other motion vector predictor is a non-zero motion vector, then the directional category corresponding to the non-zero motion vector is used to determine the candidate location for TMVP derivation.

In some embodiments, if the two selected motion vector predictors are in different non-zero categories, the category in the middle of them is chosen, and the corresponding candidate location is selected for TMVP derivation. For example, referring to FIG. 12, if the first motion vector predictor is category MV_C and the second motion vector predictor is category MV_I, then category MV_F is chosen for determining the candidate location for TMVP derivation. In another example, category MV_B is the middle category of Category MV_D and MV_F. In another example, if one of the motion vector predictors is a zero motion vector and the other motion vector predictor is the non-zero motion vector, than the category for the non-zero motion vector is used for determining the candidate location.

In some embodiments, when the categories of the two selected motion vector predictors are far apart, and the middle between these categories are in two neighboring categories, preference is given to particular categories. For example, preference may be given to categories MV_C/MV_I/MV_G/MV_A over categories MV_B/MV_F/MV_H/MV_D. Accordingly, in this example, if the two selected motion vector predictors belong to categories MV_A and MV_F, the category MV_C is selected. In another example, preference is given to categories MV_B/

MV_F/MV_H/MV_D over categories MV_C/MV_I/MV_G/MV_A. Accordingly, in this example, if the two selected motion vector predictors belong to categories MV_A and MV_F, the category MV_B is selected.

Figure 13:
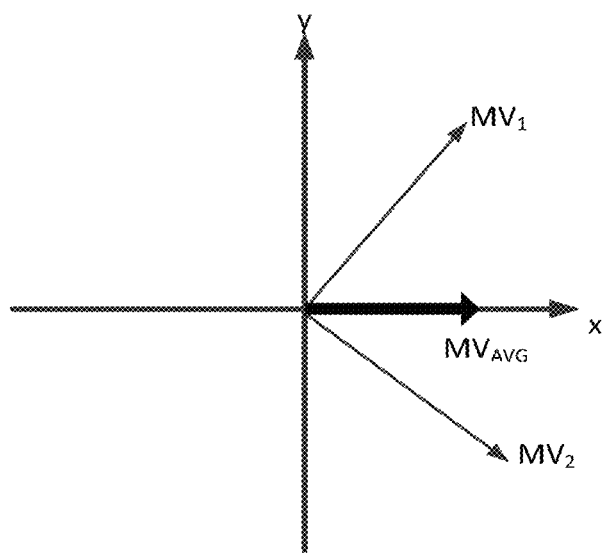
FIG. 13 illustrates an example of determining a motion vector average from two motion vectors.

In some embodiments, when two motion vector predictors are selected, the average between the two motion vectors is used for selecting a candidate location. For example, referring to FIG. 13, when the selected two motion vector predictors are $MV_1$ and $MV_2$, the average between these two motion vectors (e.g., $MV_{AVG}$) is put into one of the categories illustrated in FIG. 12 to select a candidate location. Referring to FIG. 12, the category that corresponds to $MV_{AVG}$ is MV_F. In some embodiments, the average between the two motion vectors is a mathematical average of the two motion vectors. In other embodiments, the average between the two motion vectors is an average of the signs of the two motion vectors at each component.

According to some embodiments, when motion vector predictors from three spatial neighbors are being considered, the directions (i.e., signs) of the three motion vector predictors are evaluated to select a category for determining a candidate location. For each component in a motion vector predictor (e.g., x or y), the directions the three motion vector predictors are evaluated, and the most frequently used direction is chosen. If one direction of the three motion vector predictors are in different directions (e.g., positive, zero, and negative), the zero direction is selected for that one direction.

In one example, the three motion vector predictors are (−1, −1), (2, 3), and (5, −1). In this example, for the x direction, two motion vector predictors are positive, and for the y direction, two motion vector predictors are negative. Thus, the category selected for these three motion vector predictors is MV_I (positive, negative). In another example, the three motion vector predictors are (−1, −1), (2, 0), and (5, 1). In this example, for the x direction, two motion vector predictors are positive, and for the y direction, each motion vector predictor is a different direction. Accordingly, the positive direction is chosen for x, and the zero direction is chosen for y, and thus, the category selected for the three motion vector predictors is category MV_F.

In another embodiment when three motion vector predictors are being considered, for each component (x or y), the median value of the three motion vector predictors are used. If one motion vector predictor is not available at the selected location, the zero motion vector predictor is used.

In FIG. 14, the 9 possible candidate locations associated with the collocated block are shown. For each location, a corresponding motion vector direction is shown in FIG. 12. According to some embodiments, a candidate block from one of the nine candidate locations is chosen to derive the TMVP for a current block. In one embodiment, if the motion vector predictor of location X (X being one of MV_A to MV_I) is not available, center candidate location CL_E will be used. In another embodiment, if X equals to MV_E, candidate location CL_I is used for TMVP derivation.

Figure 15:
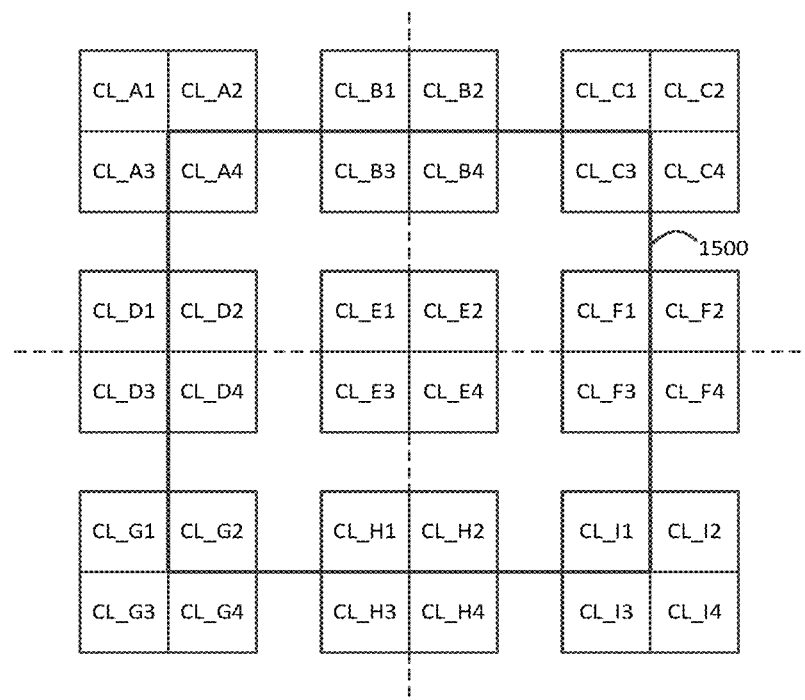
FIG. 15 illustrates example candidate locations with respect to a collocated block.

According to some embodiments, for each candidate location in the collocated block from CL_A to CL_I, includes a plurality of candidate blocks that are used to represent this location. Referring to FIG. 15, which illustrates collocated block 1500, there are four adjacent candidate blocks for each candidate location. For example, candidate location CL_A corresponds to the group of candidate blocks CL_A1, CL_A2, CL_A3, and CL_A4. As illustrated in FIG. 1500, candidate blocks CL_A1, CL_A2, and CL_A3 are outside of collocated block 1500, and block CLA_4 is inside of collocated block 1500. One of these the candidate blocks is selected for performing TMVP derivation. In some situations, the blocks inside the collocated block 1500 may provide a different effect than the blocks outside of collocated block 1500. According to some embodiments, once a candidate block from the candidate location is selected, the derivation process of TMVP for a current block may be performed, including scaling and sign change, for the current block.

TABLE 1 below illustrates the group of blocks in FIG. 15 that correspond to the candidate locations in FIG. 14. Furthermore, Table 1 indicates which blocks are outside and inside of collocated block 1500.

| Candidate Location | Blocks Outside of Collocated Block | Blocks inside of Collocated Block |
| --- | --- | --- |
| CL_A | CL_A1, CL_A2, CL_A3 | CL_A4 |
| CL_B | CL_B1, CL_B2 | CL_B3, CL_B4 |
| CL_C | CL_C1, CL_C2, CL_C4 | CL_C3 |
| CL_D | CL_D1, CL_D3 | CL_D2, CL_D4 |
| CL_E | | CL_E1, CL_E2, CL_E3, CL_E4 |
| CL_F | CL_F2, CL_F4 | CL_F1, CL_F3 |
| CL_G | CL_G1, CL_G3, CL_G4 | CL_G2 |
| CL_H | CL_H3, CL_H4 | CL_H1, CL_H2 |
| CL_I | CL_I2, CL_I3, CL_I4 | CL_I1 |

Referring back to FIG. 8, the collocated picture 802 and the reference picture 804 for the current block 800, and spatial neighboring blocks of the current block are on the same side relative to the current picture 804. In this regard, the picture order count (POC) numbers (or the number in display order) of the collocated picture 802 and the reference picture 804 are both greater than or both less than the current picture 800. When one of these two pictures' POC numbers (or the number in display order) is greater than the current picture while the other is smaller, proper motion vector scaling may be performed so that the indicated TMVP location, in accordance with the embodiments of the present disclosure, can reflect the trend of the moving object from the current picture to the reference picture.

Figure 16:
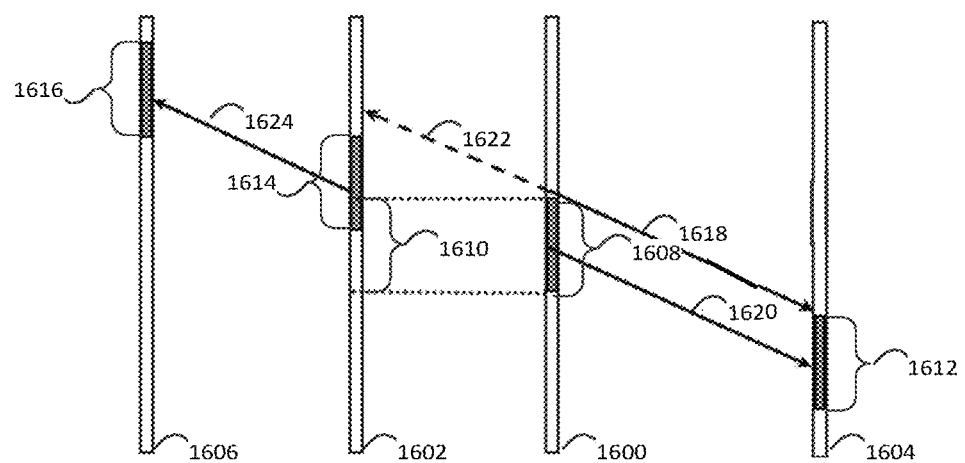
FIG. 16 illustrates an example of TMPV derivation in which a reference picture and collocated picture are on opposite sides of a current picture.

FIG. 16, illustrates a current picture 1600 having a current block 1608. A collocated picture 1602 includes collocated block 1610 of the current block 1608. The current picture 1600 is associated with reference picture 1604, and the collocated picture 1602 is associated with reference picture 1606. The reference picture 1606 and collocated picture 1602 include the same moving object 1616 and 1614, respectively. The moving object also coincides with the current block 1608. The reference picture 1604 also includes the same moving object 1612.

In FIG. 16, the current block's 1608 top neighbor has the reference picture 1604, which has a POC number greater than the current picture 1600. When the motion vector 1618 of the top neighbor is used for finding the candidate location in the collocated block 1610, this motion vector is scaled (i.e., motion vector 1622) as if the collocated picture 1602 is the reference picture 1604. After motion vector scaling, the scaled vector 1622 is used to evaluate which location of the collocated block 1610 should be used for TMVP derivation. In the example in FIG. 16, the top corner of the collocated block is chosen to derive the TMVP. The top corner of the collocated block includes motion vector 1624. The TMVP for the current block 1608 is also scaled (i.e., motion vector 1620) to the reference picture for the current block.

The scaling of a motion vector may be performed in the following situation. When a motion vector is used to predict the current block, if the current block's ref picture and the motion vector predictor's ref picture are in different directions (e.g., one is in the past, the other in the future), the motion vector predictor needs to be reversed in direction to reflect the continuous motion across the frames. This reversal is part of the motion vector scaling (i.e., direction and magnitude scaling) in the TMVP calculation. Accordingly, if the neighboring motion vector of the current block is from another direction with respect to the reference picture, the neighboring motion vector has to be scaled to reflect the correct direction for finding the collocated block position in the collocated picture, which is in an opposite direction of this neighboring motion vector predictor's reference picture.

According to some embodiments, if a selected location from the collocated block for TMVP derivation is outside the boundary of the collocated picture, its nearest neighbor that is inside the picture boundary should be used instead. For example, in FIG. 15, if the selected position is CL_B1, which may be outside of the picture boundary, then location CL_B3 should be used instead. In another example, in FIG. 15, if the selected position is CL D1, which may be outside of the picture boundary, then location CL_D2 should be used instead.

Figure 17:
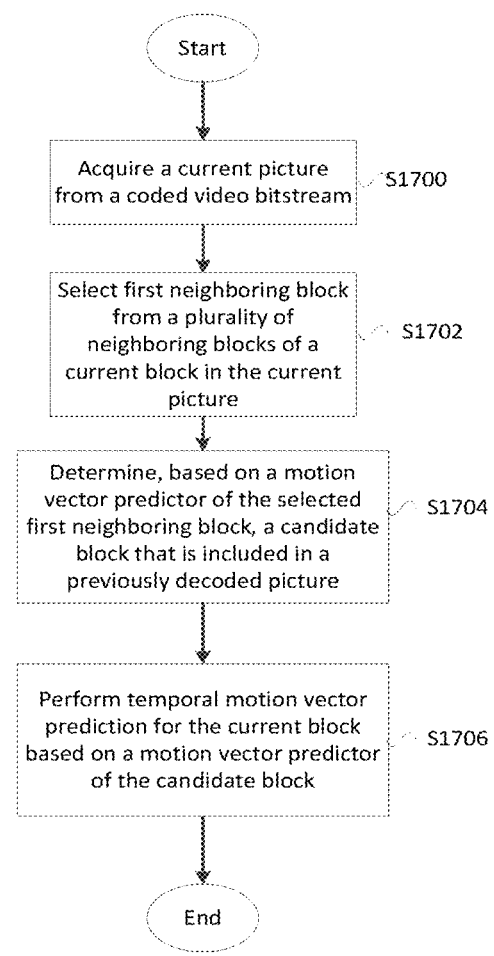
FIG. 17 illustrates an embodiment of a process performed by an encoder or a decoder.

FIG. 17 illustrates an embodiment of a process performed by an encoder or decoder such as such as intra encoder 522 or intra decoder 672, respectively. The process may start at step S1700 where a current picture form a coded video bitstream is acquired. The process proceeds to step S1702 where a first neighboring block from a plurality of neighboring blocks of a current block in the current picture is selected. For example, referring to FIG. 11, which illustrates current block 1100, one of the neighboring blocks (i.e., $NA_1$, $NA_2$, $NA_3$, $NC_1$, $NC_2$, $NB_1$, and $NB_2$) may be selected.

The process proceeds to step S1704, where based on a motion vector predictor of the selected first neighboring block, a candidate block that is included in a previously decoded picture is determined. For example, neighboring block $C_1$ may be selected, which may have a motion vector predictor that is in category MV_A (FIG. 12). Accordingly, as discussed above, category MV_A is associated with candidate location CL_A (FIG. 14). Thus, a candidate block from candidate location CL_A is selected for TMVP derivation. The process proceeds to step 1706 where TMVP for the current block is performed based on a motion vector predictor of the candidate block.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
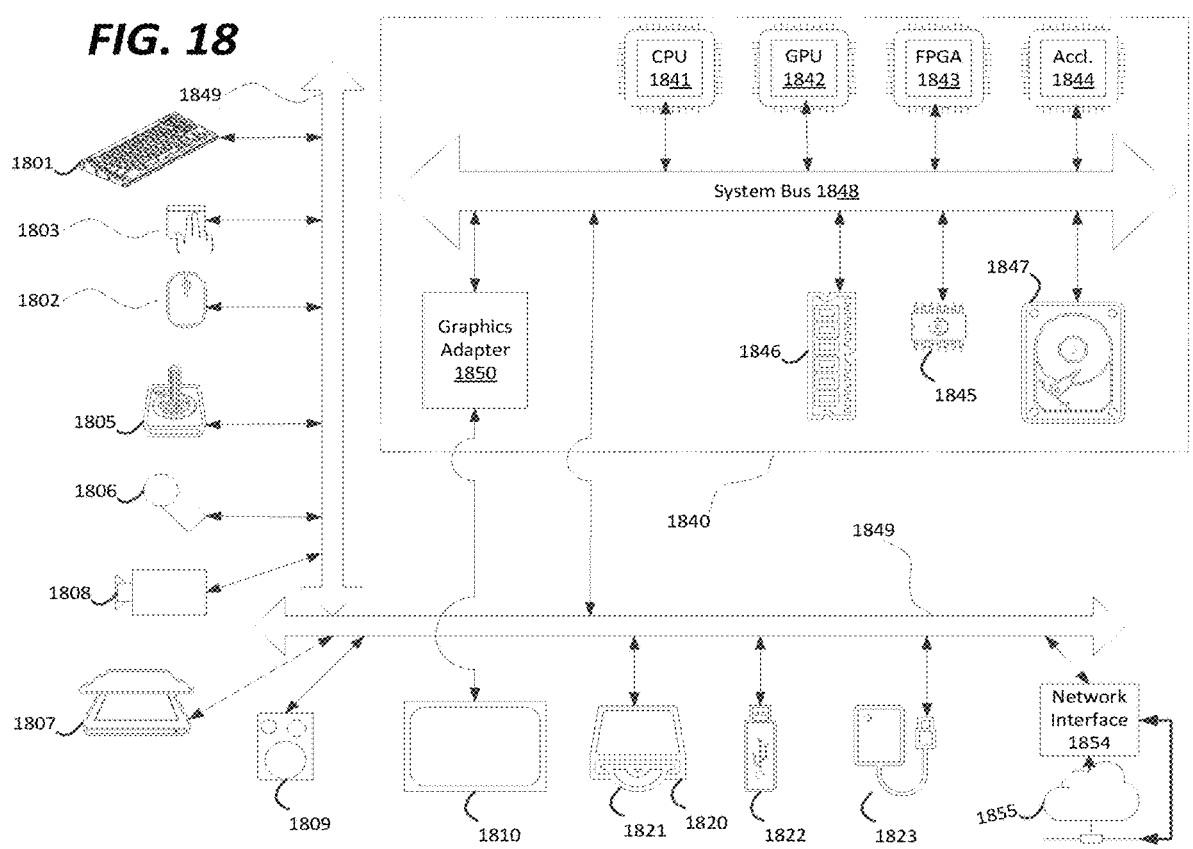
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like. CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

MV: Motion Vector
HEVC: High Efficiency Video Coding
SET: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding for a decoder, the method including acquiring a current picture from a coded video bitstream; selecting a first neighboring block from a plurality of neighboring blocks of a current block in the current picture; determining, based on a motion vector predictor of the selected first neighboring block, a candidate block that is included in a previously decoded picture and that is one of (i) neighboring to a collocated block of the current block and (ii) within the collocated block; and performing temporal motion vector prediction for the current block based on a motion vector predictor of the candidate block.

(2) The method according to feature (1), in which the motion vector predictor of the selected neighboring block is one of (i) a non-zero motion vector predictor that is used to determined the neighboring block of the collocated block as the candidate block and (ii) a zero motion vector that is used to determine the block within the collocated block as the candidate block.

(3) The method according to feature (2), in which the motion vector predictor of the selected neighboring block is the non-zero motion vector predictor and the candidate block is selected from a plurality of blocks that includes the neighboring block of the collocated block and blocks adjacent to the neighboring block of the collocated block.

(4) The method according to feature (2), in which the motion vector predictor of the selected neighboring block is the zero motion vector predictor and the candidate block is selected from a plurality of blocks that includes the block within the collocated block and blocks adjacent to the block within the collocated block.

(5) The method according to any one of features (1)-(4), further including selecting a second neighboring block from the plurality of neighboring blocks of the current block in the current picture, in which the determining the candidate block includes determining the candidate block based on an average of (i) the motion vector predictor of the selected first neighboring block and (ii) a motion vector prediction of the selected second neighboring block.

(6) The method according to any one of features (1)-(5), further including selecting a second neighboring block from the plurality of neighboring blocks of the current block in the current picture, in which the motion vector predictor of the selected first neighboring block is a non-zero motion vector predictor and a motion vector predictor of the selected second neighboring block is a zero motion vector predictor, in which the determining the candidate block includes determining the candidate block based on the non-zero motion vector predictor.

(7) The method according to any one of features (1)-(6), in which the plurality of neighboring blocks of the current block is one of a (i) bottom left corner, (ii) top left corner, and (iii) top right corner of the adjacent block.

(8) The method according to any one of features (5)-(7), in which the average is one of i) a mathematical average of the two motion vectors, and ii) an average of the signs of the two motion vectors at each component.

(9) A video decoder for video decoding including processing circuitry configured to: acquire a current picture from a coded video bitstream, select a first neighboring block from a plurality of neighboring blocks of a current block in the current picture, determine, based on a motion vector predictor of the selected first neighboring block, a candidate block that is included in a previously decoded picture and that is one of (i) neighboring to a collocated block of the current block and (ii) within the collocated block, and perform temporal motion vector prediction for the current block based on a motion vector predictor of the candidate block.

(10) The video decoder according to feature (9), in which the motion vector predictor of the selected neighboring block is one of (i) a non-zero motion vector predictor that is used to determined the neighboring block of the collocated block as the candidate block and (ii) a zero motion vector that is used to determine the block within the collocated block as the candidate block.

(11) The video decoder according to feature (10), in which the motion vector predictor of the selected neighboring block is the non-zero motion vector predictor and the candidate block is selected from a plurality of blocks that includes the neighboring block of the collocated block and blocks adjacent to the neighboring block of the collocated block.

(12) The video decoder according to feature (10), in which the motion vector predictor of the selected neighboring block is the zero motion vector predictor and the candidate block is selected from a plurality of blocks that includes the block within the collocated block and blocks adjacent to the block within the collocated block.

(13) The video decoder according to any one of features (9)-(12), in which the processing circuitry is further configured to: select a second neighboring block from the plurality of neighboring blocks of the current block in the current picture, in which the determination of the candidate block includes determining the candidate block based on an average of (i) the motion vector predictor of the selected first neighboring block and (ii) a motion vector prediction of the selected second neighboring block.

(14) The video decoder according to any one of features (9)-(13), in which the processing circuitry is further configured to: select a second neighboring block from the plurality of neighboring blocks of the current block in the current picture, in which the motion vector predictor of the selected first neighboring block is a non-zero motion vector predictor and a motion vector predictor of the selected second neighboring block is a zero motion vector predictor, in which the determination of the candidate block includes determining the candidate block based on the non-zero motion vector predictor.

(15) The video decoder according to any one of features (9)-(14), in which the plurality of neighboring blocks of the current block is one of a (i) bottom left corner, (ii) top left corner, and (iii) top right corner of the adjacent block.

(16) The video decoder according to any one of features (13)-(15), in which the average is one of i) a mathematical average of the two motion vectors, and ii) an average of the signs of the two motion vectors at each component.

(17) A non-transitory computer readable medium having instructions stored therein, which when executed by a processor in a video decoder causes the processor to execute a method including acquiring a current picture from a coded video bitstream; selecting a first neighboring block from a plurality of neighboring blocks of a current block in the current picture; determining, based on a motion vector predictor of the selected first neighboring block, a candidate block that is included in a previously decoded picture and that is one of (i) neighboring to a collocated block of the current block and (ii) within the collocated block; and performing temporal motion vector prediction for the current block based on a motion vector predictor of the candidate block.

(18) The non-transitory computer readable medium according to feature (17), in which the motion vector predictor of the selected neighboring block is one of (i) a non-zero motion vector predictor that is used to determined the neighboring block of the collocated block as the candidate block and (ii) a zero motion vector that is used to determine the block within the collocated block as the candidate block.

(19) The non-transitory computer readable medium according to feature (18), in which the motion vector predictor of the selected neighboring block is the non-zero motion vector predictor and the candidate block is selected from a plurality of blocks that includes the neighboring block of the collocated block and blocks adjacent to the neighboring block of the collocated block.

(20) The non-transitory computer readable medium according to feature (18), in which the motion vector predictor of the selected neighboring block is the zero motion vector predictor and the candidate block is selected from a plurality of blocks that includes the block within the collocated block and blocks adjacent to the block within the collocated block.

What is claimed is:

1. A method of video decoding for a decoder, the method comprising:
   acquiring a current picture from a coded video bitstream;
   selecting a previously decoded first neighboring block in the current picture from a plurality of previously decoded neighboring blocks of a current block;
   determining a directional category of a motion vector of the selected previously decoded first neighboring block, wherein the determined directional category is one of plural directional categories, each of the plural directional categories is defined as corresponding to one or more motion vector angles having a corresponding block location in a collocated picture;
   selecting a candidate block that is included in a previously decoded collocated picture, the selected candidate block having a block location corresponding to the determined directional category of the motion vector of the selected previously decoded first neighboring block in the current picture, and the selected candidate block is one of (i) neighboring to a collocated block of the current block and (ii) within the collocated block; and
   performing temporal motion vector prediction for the current block based on a motion vector of the candidate block.

2. The method according to claim 1, wherein the motion vector of the selected previously decoded first neighboring block in the current picture is one of (i) a non-zero motion vector that is used to determine the block location of the candidate block as a neighboring location of the collocated block and (ii) a zero motion vector that is used to determine the location of the candidate block as a block location within the collocated block.

3. The method according to claim 2, wherein the motion vector of the selected previously decoded first neighboring block in the current picture is the non-zero motion vector and the candidate block is selected from a plurality of blocks that includes a neighboring block of the collocated block and blocks adjacent to the neighboring block of the collocated block.

4. The method according to claim 2, wherein the motion vector of the selected previously decoded first neighboring block in the current picture is the zero motion vector and the candidate block is selected from a plurality of blocks that includes a block within the collocated block and blocks adjacent to the block within the collocated block.

5. The method according to claim 1, further comprising:
   selecting a previously decoded second neighboring block from the plurality of previously decoded neighboring blocks of the current block in the current picture,
   wherein the determining the directional category is based on an average of (i) the motion vector of the selected previously decoded first neighboring block in the current picture and (ii) a motion vector of the selected previously decoded second neighboring block in the current picture.

6. The method according to claim 5, wherein the average is one of i) a mathematical average of the motion vector of the selected previously decoded first neighboring block in the current picture and the motion vector of the selected previously decoded second neighboring block in the current picture, and ii) an average of signs of the motion vector of the selected previously decoded first neighboring block in the current picture and the motion vector of the selected previously decoded second neighboring block in the current picture.

7. The method according to claim 1, further comprising:
   selecting a previously decoded second neighboring block from the plurality of previously decoded neighboring blocks of the current block in the current picture,
   wherein the motion vector of the selected previously decoded first neighboring block in the current picture is a non-zero motion vector and a motion vector of the selected previously decoded second neighboring block in the current picture is a zero motion vector, and
   wherein the determining the directional category is based on the non-zero motion vector.

8. The method according to claim 1, wherein the plurality of previously decoded neighboring blocks of the current block in the current picture includes a block adjacent to one of a (i) bottom left corner, (ii) top left corner, and (iii) top right corner of the current block.

9. A video decoder for video decoding, comprising:
   processing circuitry configured to:
      acquire a current picture from a coded video bitstream,
      select a previously decoded first neighboring block in the current picture from a plurality of previously decoded neighboring blocks of a current block,
      determine a directional category of a motion vector of the selected previously decoded first neighboring block, wherein the determined directional category is one of plural directional categories, each of the plural directional categories is defined as corresponding to one or more motion vector angles having a corresponding block location in a collocated picture;
      select a candidate block that is included in a previously decoded collocated picture, the selected candidate block having a block location corresponding to the determined directional category of the motion vector of the selected previously decoded first neighboring block in the current picture, and the selected candidate block is one of (i) neighboring to a collocated block of the current block and (ii) within the collocated block, and
      perform temporal motion vector prediction for the current block based on a motion vector of the candidate block.

10. The video decoder according to claim 9, wherein the motion vector of the selected previously decoded first neighboring block in the current picture is one of (i) a non-zero motion vector that is used to determine the block location of the candidate block as a neighboring location of the collocated block and (ii) a zero motion vector that is used to determine the block location of the candidate block as a location within the collocated block.

11. The video decoder according to claim 10, wherein the motion vector of the selected previously decoded first neighboring block in the current picture is the non-zero motion vector and the candidate block is selected from a plurality of blocks that includes a neighboring block of the collocated block and blocks adjacent to the neighboring block of the collocated block.

12. The video decoder according to claim 10, wherein the motion vector of the selected previously decoded first neighboring block in the current picture is the zero motion vector and the candidate block is selected from a plurality of blocks that includes a block within the collocated block and blocks adjacent to the block within the collocated block.

13. The video decoder according to claim 9, wherein the processing circuitry is further configured to:
select a previously decoded second neighboring block from the plurality of previously decoded neighboring blocks of the current block in the current picture,
wherein the determination of the directional category is based on an average of (i) the motion vector of the selected previously decoded first neighboring block in the current picture and (ii) a motion vector of the selected previously decoded second neighboring block in the current picture.

14. The video decoder according to claim 13, wherein the average is one of i) a mathematical average of the motion vector of the selected previously decoded first neighboring block in the current picture and the motion vector of the selected previously decoded second neighboring block in the current picture, and ii) an average of signs of the motion vector of the selected previously decoded first neighboring block in the current picture and the motion vector of the selected previously decoded second neighboring block in the current picture.

15. The video decoder according to claim 9, wherein the processing circuitry is further configured to:
select a previously decoded second neighboring block from the plurality of previously decoded neighboring blocks of the current block in the current picture,
wherein the motion vector of the selected previously decoded first neighboring block in the current picture is a non-zero motion vector and a motion vector of the selected previously decoded second neighboring block in the current picture is a zero motion vector, and
wherein the determination of the directional category is based on the non-zero motion vector.

16. The video decoder according to claim 9, wherein the plurality of previously decoded neighboring blocks of the current block in the current picture includes a block adjacent to one of a (i) bottom left corner, (ii) top left corner, and (iii) top right corner of the current block.

17. A non-transitory computer readable medium having instructions stored therein, which when executed by a processor in a video decoder causes the processor to execute a method comprising:
acquiring a current picture from a coded video bitstream;
selecting a previously decoded first neighboring block in the current picture from a plurality of previously decoded neighboring blocks of a current block;
determining a directional category of a motion vector of the selected previously decoded first neighboring block, wherein the determined directional category is one of plural directional categories, each of the plural directional categories is defined as corresponding to one or more motion vector angles having a corresponding block location in a collocated picture,
selecting a candidate block that is included in a previously decoded collocated picture, the selected candidate block having a block location corresponding to the determined directional category of the motion vector of the selected previously decoded first neighboring block in the current picture, and the selected candidate block is one of (i) neighboring to a collocated block of the current block and (ii) within the collocated block; and
performing temporal motion vector prediction for the current block based on a motion vector of the candidate block.

18. The non-transitory computer readable medium according to claim 17, wherein the motion vector of the selected previously decoded first neighboring block in the current picture is one of (i) a non-zero motion vector that is used to determine the block location of the candidate block as a neighboring location of the collocated block and (ii) a zero motion vector that is used to determine the block location of the candidate block as a location within the collocated block.

19. The non-transitory computer readable medium according to claim 18, wherein the motion vector of the selected previously decoded first neighboring block in the current picture is the non-zero motion vector and the candidate block is selected from a plurality of blocks that includes a neighboring block of the collocated block and blocks adjacent to the neighboring block of the collocated block.

20. The non-transitory computer readable medium according to claim 18, wherein the motion vector of the selected previously decoded first neighboring block in the current picture is the zero motion vector and the candidate block is selected from a plurality of blocks that includes a block within the collocated block and blocks adjacent to the block within the collocated block.

* * * * *